United States Patent

Noah et al.

[11] Patent Number: 5,423,401
[45] Date of Patent: Jun. 13, 1995

[54] BRAKE ACTUATOR HAVING COLLET STYLE SLACK ADJUSTER

[75] Inventors: Lewis Noah, Greer; Roland Moore, Taylors; Stefan Seidl, Tigerville; Lee Lipford, Union, all of S.C.

[73] Assignee: Westinghouse Air Brake Company, Wilmerding, Pa.

[21] Appl. No.: 224,265

[22] Filed: Apr. 7, 1994

[51] Int. Cl.$^6$ ............................................. F16D 65/56
[52] U.S. Cl. .................. 188/203; 188/196 V; 188/196 D; 188/199
[58] Field of Search .................. 188/202, 203, 196 D, 188/196 V, 198, 199, 196 P, 196 B, 153 R, 79.56

[56] References Cited

U.S. PATENT DOCUMENTS

| | | | |
|---|---|---|---|
| 3,100,032 | 8/1963 | Larsson | 188/203 X |
| 3,595,347 | 7/1971 | Billeter | 188/196 D X |
| 3,669,224 | 6/1972 | Billeter | 188/202 |
| 4,676,346 | 6/1987 | Barberis | 188/202 |
| 4,825,980 | 5/1989 | Schmitt | 188/202 |
| 4,895,228 | 1/1990 | Washbourn | 188/196 D |

FOREIGN PATENT DOCUMENTS

3245028  6/1984  Germany ............................. 188/203

*Primary Examiner*—Robert J. Oberleitner
*Assistant Examiner*—Peter M. Poon
*Attorney, Agent, or Firm*—James O. Ray, Jr.

[57] ABSTRACT

A brake actuator includes a tubular housing member, connected at a first end to a cylindrical housing with a member for admitting fluid, a piston with a sealing member mounted for reciprocal movement within such cylindrical housing, a tubular stem connected at one end to such piston, the tubular stem having a first conical surface at its other end, a piston return disposed intermediate such first piston and the tubular housing, a flange connected at one end to another end of the tubular housing, a pair of abutment surfaces carried by such flange and an externally threaded rod having a first portion extending inside the tubular housing and such tubular stem and a second portion extending outwardly from such tubular housing and through the flange, the improvement of a collet style slack adjuster to adjust for wear of braking elements. Such collet style slack adjuster including a power collet threadedly engaging such threaded rod and a first plurality of flexible fingers connected to such power collet and positioned around such threaded rod. A second conical surface carried by such power collet matingly engages the first tubular stem conical surface for providing a clutch surface. A slack adjuster collet threadedly engages such threaded rod intermediate the power collet and the second end of such threaded rod. A portion of the slack adjuster collet is disposed between the flange abutment surfaces and a second plurality of flexible fingers are connected to the slack adjuster collet and positioned around such threaded rod.

20 Claims, 4 Drawing Sheets

FIG. I

BRAKE ACTUATOR HAVING COLLET STYLE SLACK ADJUSTER

FIELD OF THE INVENTION

The present invention relates, in general, to fluid pressure responsive type brake actuators for use on railway or other similar type vehicles and, more particularly, this invention relates to such a fluid pressure responsive type brake actuator having an improved collet style slack adjusting arrangement incorporated therein which enables substantially fewer operating components to be used in such brake actuator.

BACKGROUND OF THE INVENTION

Prior to the present invention, it is generally recognized in the art that fluid pressure responsive railway car brake actuators have been used on passenger transit type vehicles.

These brake actuators generally consist of a tubular housing member which is equipped with a cylinder portion adjacent one end thereof. A piston member is slidably disposed within such cylinder portion of the brake actuator. Such piston member is positioned to slide under the action of a predetermined fluid being communicated to the cylinder portion under pressure and against the action of at least one elastic type spring retraction means. Such piston member includes a generally hollow shaft member connected thereto, which normally does not rotate in relation to the tubular housing and in which is axially connected a threaded rod member to operate the braking means disposed on the vehicle.

In this particular prior art type brake actuator, the threaded rod member is likewise a nonrotating member with respect to such tubular housing member. During the braking action of the threaded rod member, a clutch-type, self-adjusting mechanism is provided which will cause the relative axial positions between the threaded rod member and the hollow shaft member to be changed as necessary when such above-mentioned vehicle braking means begins to exhibit excessive brake shoe wear. Such self-adjusting mechanism generally consists of an internally threaded stopping ring member which is threadedly engaged with a threaded rod member and includes a front coupling portion which matingly engages with a corresponding front coupling portion of the hollow shaft member to block the rotation of the stopping ring member, in relation to the generally hollow shaft member, and elastic spring retraction means are provided to restore the engagement of these front coupling portions, by the screwing of the retaining element in relation to the threaded rod member, after an axial separation between these front coupling elements has been achieved.

In addition, there is a friction ring member disposed between the tubular housing member and the threaded rod member. Such friction ring member acts on the threaded rod member and slides together with such threaded rod member in relation to the tubular housing member, during the normal braking operation of such fluid pressure responsive brake actuator, for a predetermined brake stroke length.

There are limit stop means positioned on the tubular housing member in order to limit the longitudinal movement of such friction ring member at the completion of such predetermined stroke length and to additionally allow for an axial sliding movement of the threaded rod member in relationship to the hollow shaft member, in order to automatically adjust the stroke length of the brake actuator for any excess wear exhibited by the vehicle braking means.

As is evident, therefore, in this known prior art type fluid pressure responsive brake actuator the threaded rod member will slide out of the hollow shaft member every time the advancement of such hollow shaft member is greater than the predetermined normal brake stroke length as defined by the above-mentioned limit stop means.

This brake stroke overtravel length may be due, in most cases, to the normal wearing of the brake shoes disposed on the vehicle, the braking actuator itself and, also, it can be at least partially due to the normal elastic give of the brake force transmission elements, which connect the brake actuator to the vehicle brake unit.

These brake force transmission elements generally consist of two caliper arm members. One of such caliper arm members being connected, in a known manner, to the brake actuator housing member and the other one of such caliper arm members being connected to the free end of such threaded rod member. These caliper arm members include a pair of friction brake pads which are adapted to engage a disc of the railway car or similar passenger transit type vehicle.

The required action to adjust for the above-mentioned play and/or elastic give of the brake actuator has generally been found to be negligible in nature. In other words, such play and elastic give encountered is normally not of sufficient magnitude to have any adverse effect on the correct operation of the fluid pressure responsive brake actuator. However, in some particular known applications, the adjustment action required to be taken by such self-adjusting mechanism to take up the play encountered due to such elastic give of the brake actuator is undesirable and must, therefore, be eliminated.

For a more complete understanding of known prior art type fluid pressure responsive brake actuators reference can be made to U.S. Pat. Nos. 4,676,346 and 4,895,228, the disclosures of which are incorporated herein by reference thereto.

SUMMARY OF THE INVENTION

In a first aspect, the present invention provides in a brake actuator, for use on passenger transit railway and/or similar type vehicles, having a tubular housing member, a cylindrical housing member which is closed at a first end thereof and is connected at a radially opposed second end thereof to a first end of such tubular housing member in a substantially fluid tight manner, a fluid communication means is connected to such cylindrical housing member for communicating a predetermined fluid, such as compressed air, under a predetermined pressure to an interior portion of such cylindrical housing member during a brake application on such vehicle, a piston member is mounted for reciprocal movement within such cylindrical housing member, a sealing means is connected to such piston member for sealing the piston member in a fluid tight manner against an inner surface of such cylindrical housing member, a hollow tubular portion is connected at a first end thereof to and extending outwardly from a first surface of such piston member, a first conical surface is disposed on an axially opposed second end of such hollow tubular portion, a piston member return means is disposed intermediate a first seat carried by the first surface of the piston member and a second seat carried by such tubular housing member, a flange member is connected at a first end thereof to a second end of such tubular housing member, there is a pair of abutment surfaces carried by the flange member and an externally threaded rod member having a first predetermined portion disposed adjacent a first end thereof extending coaxially inside such tubular housing member and such tubular housing portion. A second predetermined portion of such threaded rod member extends outwardly from the tubular housing member and through the flange member adjacent a second end thereof, the improvement therewith of a collet style slack adjusting mechanism which adjusts for wear of the braking elements disposed on such vehicle. Such collet style slack adjusting mechanism includes a power collet member threadedly engaged with such threaded rod member. Such collet style slack adjusting mechanism further includes a first predetermined plurality of elongated and generally flexible finger members connected to the power collet member which are positioned around a periphery of the threaded rod member. A second conical surface is carried by the power collet member. Such second conical surface is matingly engageable with the first conical surface carried by the tubular housing portion for providing a clutch surface. There is a slack adjuster collet member threadedly engaged with such threaded rod member which is disposed intermediate the power collet member and the second end of such threaded rod member. At least a portion of such slack adjuster collet member is disposed between such pair of abutment surfaces carried by the flange member. Additionally, there is a second predetermined plurality of elongated and generally flexible finger members connected to such slack adjuster collet member which are also positioned around the periphery of such threaded rod member.

In a second aspect, the present invention provides a fluid pressure responsive brake actuator having an improved collet style slack adjusting mechanism incorporated therein, for use on passenger transit railway and other similar type vehicles, to adjust for any excess wear exhibited by the braking elements disposed on such vehicles. The brake actuator, according to the present invention, includes an elongated generally hollow tubular housing member. A cylindrical housing member, closed at a first end thereof, is connected at a radially opposed second end thereof to a first end of such tubular housing member in a substantially fluid tight manner. There is a fluid communication means connected to such cylindrical housing member for communicating a predetermined fluid under a predetermined pressure to an interior portion of the cylindrical housing member during a brake application on such vehicle. A piston member is mounted for reciprocal longitudinal movement within such cylindrical housing member. There is a sealing means connected to the piston member for sealing such piston member in a fluid tight manner against an inner surface of the cylindrical housing member. An elongated and generally hollow tubular housing portion is connected at a first end thereof to and extends outwardly from a first surface of such piston member. A first conical surface is disposed at an axially opposed second end of the hollow tubular housing portion. The brake actuator further includes a piston member return means which is disposed between a first seat carried by the first surface of such piston member and a second seat carried by such tubular housing member for returning the piston member to a non brake applying position upon evacuation of such predetermined fluid pressure from the interior portion of such cylindrical housing member. A flange member is connected at a first end thereof to a second end of such tubular housing member. Such flange member carries a pair of abutment surfaces. There is an externally threaded rod member which has a first predetermined portion disposed adjacent a first end thereof extending coaxially inside such tubular housing member and the tubular housing portion and a second predetermined portion which extends outwardly from such tubular housing member and through the flange member adjacent a second end thereof. A power collet member is threadedly engaged with such threaded rod member. Such power collet member has a first predetermined plurality of elongated and generally flexible finger members connected thereto which are positioned around a periphery of such threaded rod member. A second conical surface is carried by the power collet member which is matingly engageable with such first conical surface carried by the tubular housing portion for providing a clutch surface. There is a slack adjuster collet member threadedly engaged with the threaded rod member intermediate such power collet member and the second end of such threaded rod member. At least a portion of the slack adjuster collet member is disposed between such pair of abutment surfaces carried by such flange member. There is a second predetermined plurality of elongated and generally flexible finger members connected to such slack adjuster collet member. Such second plurality of finger members are also positioned around the periphery of such threaded rod member.

OBJECTS OF THE INVENTION

It is, therefore, one of the primary objects of the present invention to provide a railway and/or other similar type vehicle fluid pressure operated brake actuator having an improved collet style slack adjusting mechanism which requires significantly fewer operating components.

Another object of the present invention is to provide a railway and/or other similar type vehicle fluid pressure operated brake actuator having an improved collet style slack adjusting mechanism which is significantly more maintenance free than previously used fluid pressure responsive brake actuators.

Still another object of the present invention is to provide a railway and/or other similar type vehicle fluid pressure operated brake actuator having an improved collet style slack adjusting mechanism which is generally less expensive to manufacture, due to significantly reduced assembly time required when compared to the assembly time which was required for previously used fluid pressure responsive brake actuators.

Yet still another object of the present invention is to provide a railway and/or other similar type vehicle fluid pressure operated brake actuator having an improved collet style slack adjusting mechanism which can be easily retrofitted to existing railway and/or other similar type passenger transit vehicles.

An additional object of the present invention is to provide a railway and/or other similar type vehicle fluid pressure operated brake actuator having an improved collet style slack adjusting mechanism which does not require any special equipment to install on a railway and/or other similar type passenger transit vehicle.

A further object of the present invention is to provide a railway and/or other similar type vehicle fluid pressure operated brake actuator having an improved collet style slack adjusting mechanism which is considerably lighter in weight than previously used fluid pressure responsive brake actuators.

Still yet another object of the present invention is to provide a railway and/or other similar type vehicle fluid pressure operated brake actuator having an improved collet style slack adjusting mechanism which will exhibit a relatively long operating life.

In addition to the numerous objects and advantages of the present invention which have been described in some detail above, various other objects and advantages of the instant invention will become more readily apparent to those persons who are skilled in the railway and/or other similar type vehicle braking art from the following more detailed description of the invention, particularly, when such description is taken in conjunction with the attached drawing Figures and with the appended claims.

BRIEF DESCRIPTION OF THE PRESENTLY PREFERRED EMBODIMENTS OF THE INVENTION

Prior to proceeding to the more detailed description of the present invention, it should be pointed out that, for the sake of clarity, identical components, having identical functions, have been identified with identical reference numerals throughout the several views illustrated in the drawings.

Figure 1:
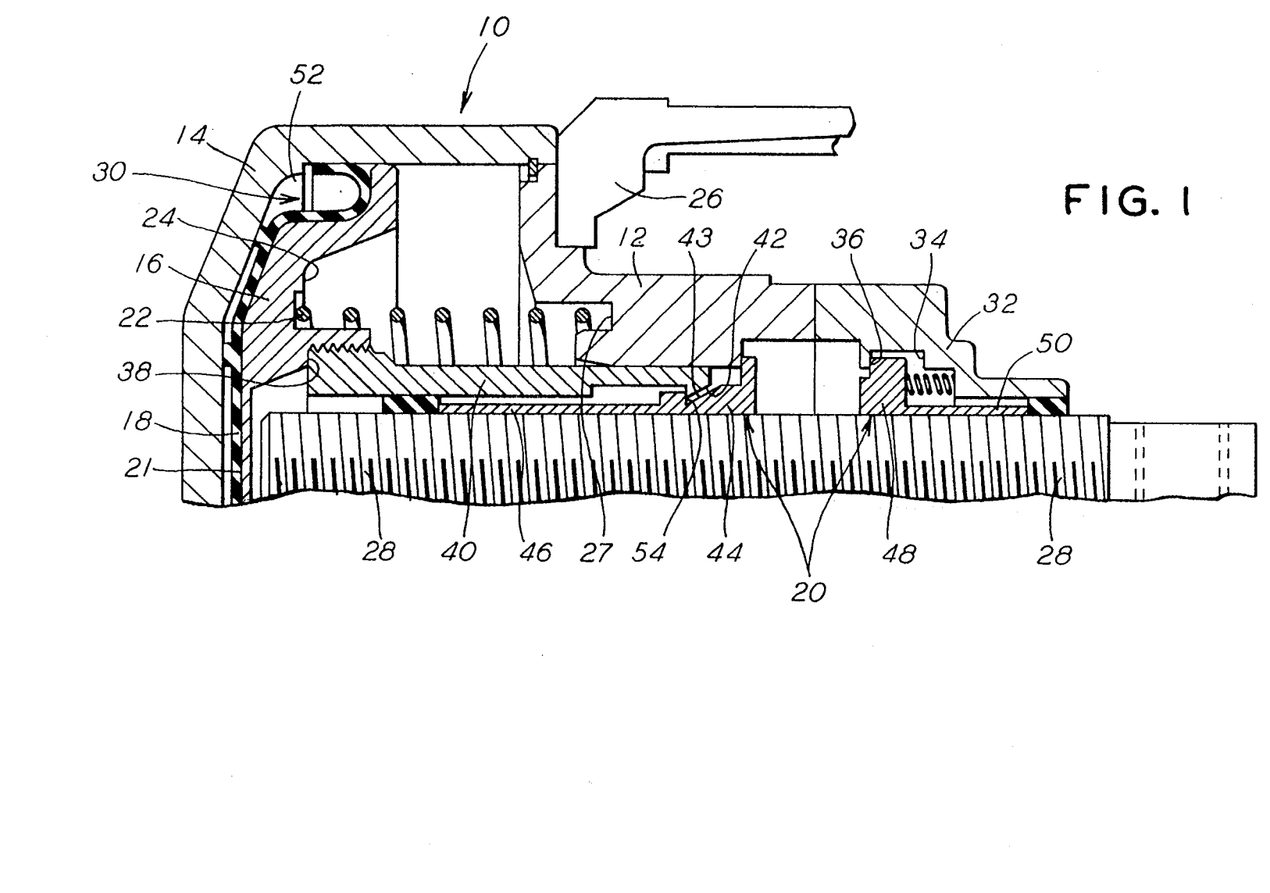
FIG. 1 is a side elevation view, partially in cross section, illustrating a one-half portion of a fluid pressure responsive brake actuator with no fluid pressure being applied and which incorporates the presently preferred embodiment of the improved collet style slack adjusting mechanism therein.
Figure 2:
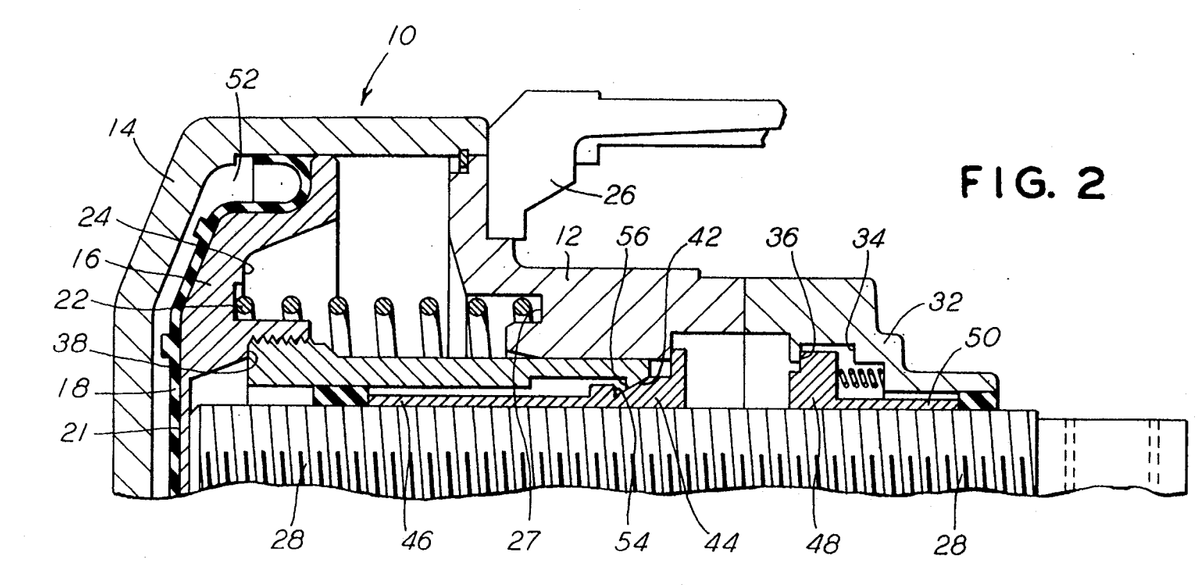
FIG. 2 is a side elevation view, similar to FIG. 1, illustrating a one-half portion of a fluid pressure responsive brake actuator with no fluid pressure being applied and which incorporates the presently preferred embodiment of the improved collet style slack adjusting mechanism therein in which the power collet is contacted by the collet closer.
Figure 3:
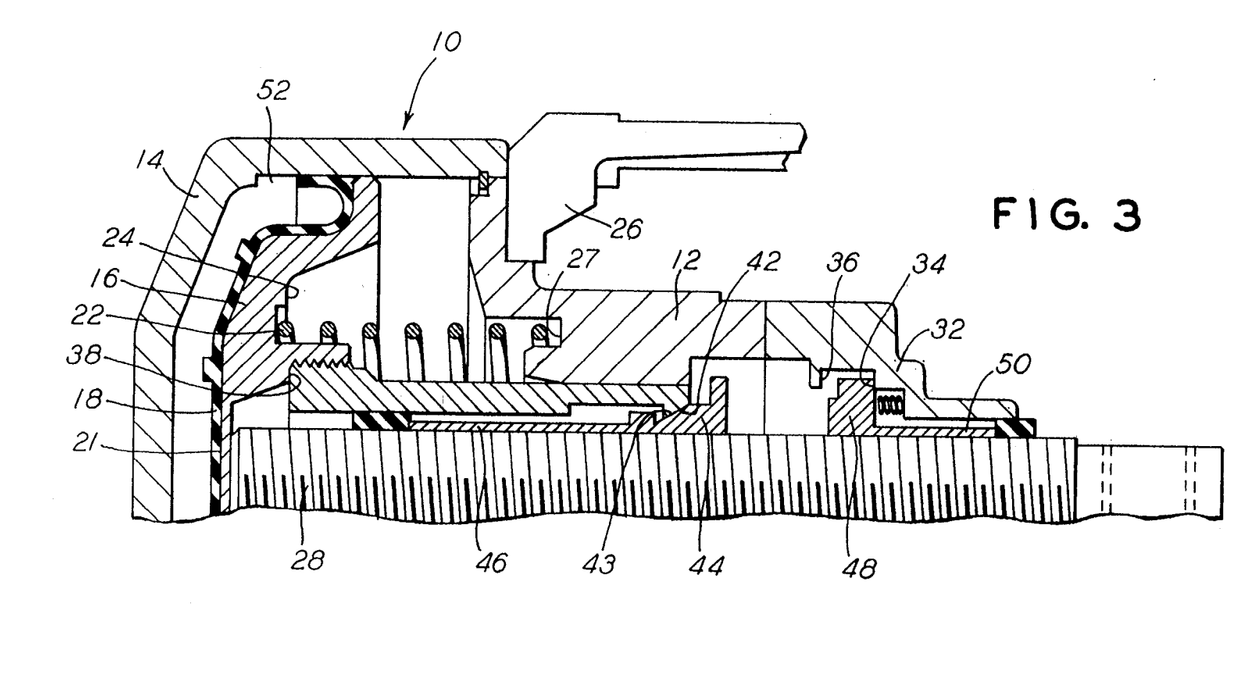
FIG. 3 is a side elevation view, similar to FIGS. 1 and 2, which illustrates a one-half portion of a fluid pressure responsive brake actuator with a fluid pressure being applied thereto and which incorporates the presently preferred embodiment of the improved collet style slack adjusting mechanism therein and in which there is full movement on the improved slack adjuster collet.
Figure 4:
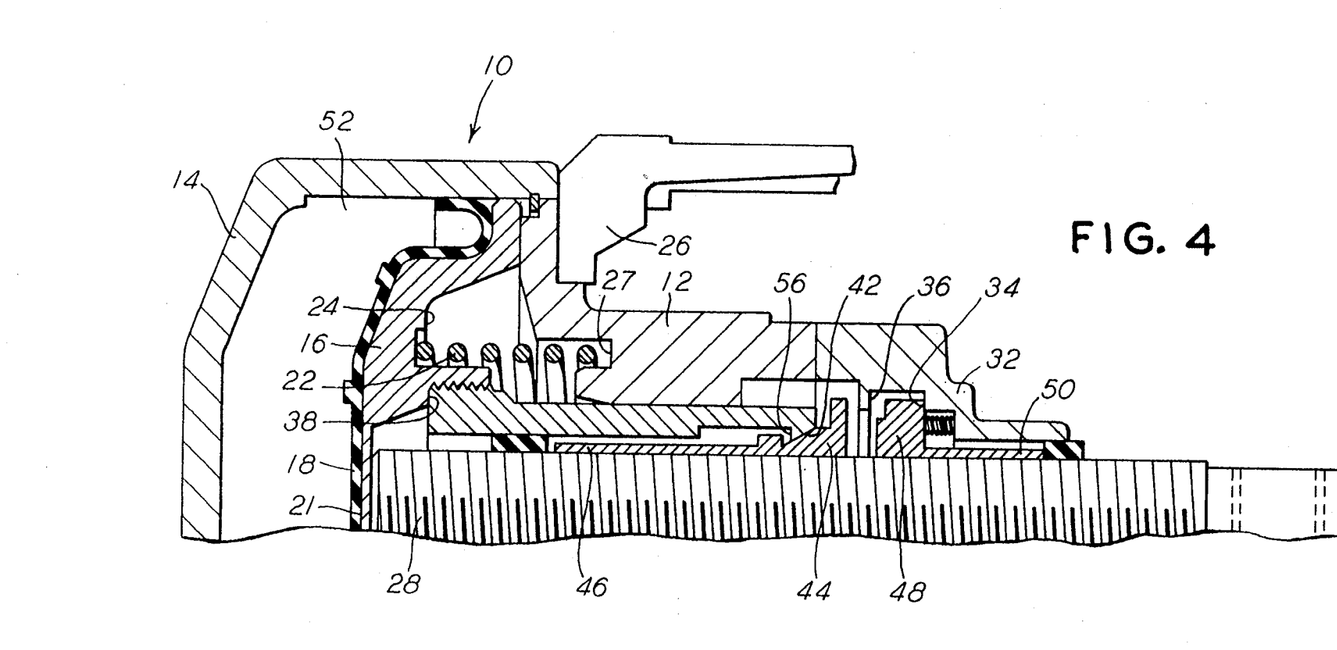
FIG. 4 is a side elevation view, similar to FIGS. 1, 2 and 3, illustrating a one-half portion of a fluid pressure responsive brake actuator with a fluid pressure being applied thereto which is at least sufficient to cause a full extension of the brake actuator and which incorporates the presently preferred embodiment of the improved collet style slack adjusting mechanism therein and in which there is full movement on the improved slack adjuster collet.

Now reference is made more particularly to FIGS. 1 through 4 of the drawings. Illustrated therein is a presently preferred embodiment of a fluid pressure operated brake actuator, generally designated, 10 for use on railway and/or similar type vehicles for controlling a braking caliper (not shown) which, in turn, is connected to a pair of friction brake pads (not shown). Such brake actuator 10 has incorporated therein an improved collet style slack adjusting mechanism, generally designated, 20 which is constructed according to the present invention.

The fluid pressure operated brake actuator 10, also, includes a generally hollow tubular housing member 12 which is equipped at one end thereof with a cylindrical housing member 14 which, preferably, is generally cup-shaped. Such cylindrical housing member 14 is equipped with a fluid connection fitting (not shown) on a predetermined portion of an end wall thereof to enable communication of a predetermined fluid, under a predetermined pressure, to a predetermined portion of the interior portion of such cylindrical housing member 14 during a brake application stroke being called for on the vehicle's brake system. Although the instant invention is not intended to be limited thereto, the presently preferred fluid to be used in the brake actuator 10 will normally be compressed air.

Mounted for reciprocal longitudinal movement within the cylindrical housing member 14 is a piston member 16. There is a sealing means, generally designated, 30 provided for sealing such piston member 16, in a substantially fluid tight manner, against the inner surface of the cylindrical housing member 14. According to the presently preferred embodiment of the instant invention, such sealing means 30 will generally be in the form of a packing cup 18 engaged with a first surface 21 of such piston member 16. As is clearly shown in the drawing Figures, this first surface of such piston member 16 faces the end wall of the cylindrical housing member 14.

It should be noted here that other forms of sealing means 30, such as, by way of example only, an o-ring type seal (not shown) can be disposed around the outer periphery of such piston member 16 may be used just as effectively. Accordingly, it is to be understood that such other forms of sealing means 30 are considered to be within the scope of the present invention.

Secured at a first end thereof to an axially opposed second surface 38 of such piston member 16 is a stem-like member comprised of an elongated and generally hollow tubular portion 40. Such hollow tubular portion 40 carries a first conical surface 42 at an axially opposed second end thereof. The functional operation of such conical surface 42 will become more clear to those skilled in the art as the detailed description of the presently preferred embodiment of the invention proceeds.

When a braking application is being called for on the vehicle and fluid pressure is being communicated to the brake actuator 10, thereby causing the piston member 16 to move to the right as seen in the drawing Figures, such piston member 16 is operating against the action of a coil spring member 22 disposed between an axially opposed second surface 24 of such piston member 16 and a surface 27 located on the tubular housing member 12.

Secured to the outer portion of the tubular housing member 12, adjacent the cylindrical housing member 14, is a brake actuator 10 mounting flange 26 used for attaching such brake actuator 10 to the vehicle (not shown).

At least a predetermined portion of an externally threaded rod member 28 is positioned in a manner such that it extends coaxially inside such tubular housing member 12. The threaded rod member 28 has an external end thereof which projects outwardly from such tubular housing member 12 and through a flange member 32.

Such flange member 32 is connected, in any convenient manner, to the outer end of such tubular housing member 12 which is disposed radially opposite the cylindrical housing member 14. This flange member 32 carries a pair of abutment shoulder portions 34 and 36 which serve as axially opposed limit stop means. The functional operation of such pair of abutment shoulder portions 34 and 36 disposed on such flange member 32 will become more clear as the detailed description of the invention proceeds.

The improved collet style slack adjusting mechanism 20, manufactured according to the presently preferred embodiment of the invention, includes a power collet member 44. Such power collet member 44 is threadedly engaged with the threaded rod member 28. The power collet member 44 includes a predetermined plurality of elongated and generally flexible finger members 46 which are disposed around a portion of the periphery of the threaded rod member 28.

Another essential element of the improved collet style slack adjusting mechanism is a slack adjuster collet member 48 which, also, includes a second predetermined plurality of elongated and generally flexible finger members 50 which are disposed around another portion of the threaded rod member 28.

During a normal operation of the brake actuator 10, i.e., with a correct friction brake shoe clearance on the vehicle, a predetermined fluid under a predetermined pressure is directly communicated to the interior portion 52 of the cylindrical housing member 14 behind the packing cup 18. This predetermined fluid pressure will be at least sufficient to force the piston member 16 to advance in a forward direction. As the piston member 16 continues to move in such forward direction, the conical surface 42, carried by the tubular housing portion 40, starts to engage a mating conical surface 43 disposed on the power collet member 44. With continued movement of the conical surface 42 over the conical surface 43 on the power collet member 44 such conical surface 42 forces the first plurality of flexible finger members 46 of the power collet member 44 to close onto the threaded rod member 28. This action causes extension of the threaded rod member 28 forward and applies a braking force to the disc brake caliper assembly (not shown).

At the time such fluid pressure is released from such interior portion 52 of the cylindrical housing member 14, the coil spring member 22 will force the piston member 16 and the packing cup 18 secured thereto to return to it's original non brake application position. It should be noted that on the return stroke of the piston member 16, the abutment shoulder portion 54 disposed on the power collet member 44 and the abutment shoulder portion 56 disposed on the tubular housing portion 40 of piston member 16 will engage and thereby pull the threaded rod member 28 back.

When, on the other hand, there is exhibited an excessive brake shoe clearance on the brake system disposed on the vehicle, the slack adjuster collet member 48 will bottom on the abutment shoulder portion 34 disposed on flange member 32. Once the slack adjuster collet member 48 bottoms out on the abutment shoulder portion 34 the threaded rod member 28 will be pushed through the slack adjuster collet member 48 and the plurality of flexible finger members 50 will flex outwardly, thereby enabling the threads on the slack adjuster collet member 48 and the threaded rod member 28 to become disengaged. In the meantime, the threads disposed on the power collet member 44 will not be disengaged from the threads on the threaded rod member 28 because they are still wedged down tightly by the conical surface 42 carried by the tubular housing portion 40 of the piston member 16.

On the return stroke of the brake actuator 10, the slack adjuster collet member 48 and the threaded rod member 28 will generally travel back until the slack adjuster collet member 48 bottoms out on the axially opposed abutment shoulder portion 36 disposed on the flange member 32. At this point, the slack adjuster collet member 48 will hold the threaded rod member 28 in place. At the same time, however, The plurality of flexible finger members 46 attached to the power collet member 44, being unwedged from the conical surface 42 and pulled by the surface 56 contacting surface 54, will flex outwardly thereby allowing the power collet member to slip over the threaded rod member 28. It should be noted that the plurality of flexible finger members 50 which are attached to the slack adjuster collet member 48 are shorter than the plurality of flexible finger members 46 attached to the power collet member 44. For this reason, such plurality of flexible finger members 46 are generally more flexible and, consequently, hold less force. The positive clearance depends on the clearance provided between the pair of abutment shoulder portions 34 and 36 disposed on the flange member 32 as well as the length of the end of the slack adjuster collet member 48.

While a number of presently preferred embodiments of the brake actuator collet style slack adjuster have been described in detail above with particular reference to the drawing Figures, it should be understood that various other modifications and adaptations of the present invention may be made by those persons who are skilled in the passenger transit vehicle braking art without departing from the spirit and scope of the appended claims.

We claim:

1. In a brake actuator, for use on railway and similar type passenger transit vehicles, having a tubular housing member, a cylindrical housing member closed at a first end thereof and connected at a radially opposed second end thereof to a first end of said tubular housing member in a substantially fluid tight manner, a fluid communication means connected to said cylindrical housing member for communicating a predetermined fluid having a predetermined fluid pressure to an interior portion of said cylindrical housing member during a brake application on such vehicle, a piston member mounted for reciprocal longitudinal movement within said cylindrical housing member, sealing means connected to said piston member for sealing said piston member in a substantially fluid tight manner against an inner surface of said cylindrical housing member, a hollow tubular stem portion connected at a first end thereof to and extending outwardly from a first surface of said piston member, a first conical surface disposed on an axially opposed second end of said hollow tubular stem portion, a piston member return means disposed intermediate a first seat carried by said first surface of said piston member and a second seat carried by said tubular housing member, a flange member connected at a first end thereof to a second end of said tubular housing member, a pair of abutment surfaces carried by said flange member and an externally threaded rod member having a first predetermined portion adjacent a first end thereof extending coaxially inside said tubular housing member and said tubular housing stem portion and a second predetermined portion extending outwardly from said tubular housing member and through said flange member adjacent a second end thereof, the improvement therewith of a collet style slack adjusting mechanism to adjust for any excess wear of braking elements disposed on such vehicle, said collet style slack adjuster comprising:

(a) a power collet member threadedly engaged with said threaded rod member;

(b) a first predetermined plurality of elongated and generally flexible finger members connected to said power collet member and positioned around a portion of a periphery of said threaded rod member;

(c) a second conical surface carried by said power collet member which is matingly engageable with said first conical surface carried by said hollow tubular stem portion for providing a clutch surface;

(d) a slack adjuster collet member threadedly engaged with said threaded rod member intermediate said power collet member and said second end of said threaded rod member, a predetermined portion of said slack adjuster collet member being disposed between said pair of abutment surfaces carried by said flange member; and (e) a second predetermined plurality of elongated and generally flexible finger members connected to said slack adjuster collet member and positioned around another predetermined portion of said periphery of said threaded rod member.

2. A collet style slack adjuster mechanism, according to claim 1, wherein a predetermined length of said first plurality of elongated and generally flexible finger members connected to said power collet member is greater than a predetermined length of said second plurality of elongated and generally flexible finger members connected to said slack adjuster collet member.

3. A collet style slack adjuster mechanism, according to claim 1, wherein said predetermined portion of said slack adjuster collet member disposed between said pair of abutment surfaces carried by said flange member includes a pair of radially opposed abutment surfaces engagable with a respective one of said pair of abutment surfaces disposed on said flange member.

4. A collet style slack adjuster mechanism, according to claim 1, wherein said collet style slack adjuster mechanism further includes a slack adjuster collet member return means disposed between a surface carried by said slack adjuster collet member and a surface carried by said flange member for returning said slack adjuster collet member to a non brake applying position upon evacuation of fluid pressure from said interior portion of said cylindrical housing member.

5. A collet style slack adjuster mechanism, according to claim 4, wherein said slack adjuster collet member return means is a coil spring.

6. A brake actuator, having an improved collet style slack adjusting mechanism incorporated therein, for use on passenger transit railway and similar type vehicles to adjust for excess wear of braking elements disposed on such vehicle, said brake actuator comprising:

(a) an elongated and generally hollow tubular housing member;

(b) a cylindrical housing member closed at a first end thereof and connected at a radially opposed second end thereof to a first end of said tubular housing member in a substantially fluid tight manner;

(c) fluid communication means connected to said cylindrical housing member for communicating a predetermined fluid having a predetermined pressure to an interior portion of said cylindrical housing member during a brake application on such vehicle;

(d) a piston member mounted for reciprocal longitudinal movement within said cylindrical housing member;

(e) sealing means connected to said piston member for sealing said piston member in a substantially fluid tight manner against an inner surface of said cylindrical housing member;

(f) an elongated and generally hollow tubular stem portion connected at a first end thereof to and extending outwardly from a first surface of said piston member;

(g) a first conical surface disposed at an axially opposed second end of said hollow tubular stem portion;

(h) a piston member return means disposed between a first seat carried by said first surface of said piston member and a second seat carried by said tubular housing member for returning said piston member to a non brake applying position on evacuation of fluid pressure from said interior portion of said cylindrical housing member;

(i) a flange member connected at a first end thereof to a second end of said tubular housing member;

(j) a pair of radially opposed abutment surfaces carried by said flange member;

(k) an externally threaded rod member having a first predetermined portion adjacent a first end thereof extending coaxially inside said tubular housing member and said hollow tubular stem portion and a second predetermined portion extending outwardly from said tubular housing member and through said flange member adjacent a second end thereof;

(l) a power collet member threadedly engaged with said threaded rod member;

(m) a first predetermined plurality of elongated and generally flexible finger members connected to said power collet member and positioned around a portion of a periphery of said threaded rod member;

(n) a second conical surface carried by said power collet member which is matingly engageable with said first conical surface carried by said hollow tubular stem portion for providing a clutch surface;

(o) a slack adjuster collet member threadedly engaged with said threaded rod member intermediate said power collet member and said second end of said threaded rod member, at least a portion of said slack adjuster collet member being disposed between said pair of said radially opposed abutment surfaces carried by said flange member; and (p) a second predetermined plurality of elongated and generally flexible finger members connected to said slack adjuster collet member and positioned around another portion of said periphery of said threaded rod member.

7. A brake actuator, according to claim 6, wherein said brake actuator further includes a mounting flange connected to said brake actuator for securing said brake actuator to such vehicle.

8. A brake actuator, according to claim 6, wherein said brake actuator further includes a slack adjuster collet member return means disposed between a surface carried by said slack adjuster collet member and a surface carried by said flange member for returning said slack adjuster collet member to a non brake applying position upon evacuation of said fluid pressure from said interior portion of said cylindrical housing member.

9. A brake actuator, according to claim 8, wherein said slack adjuster collet member return means is a coil spring.

10. A brake actuator, according to claim 9, wherein said piston member return means is a coil spring.

11. A brake actuator, according to claim 6, wherein said cylindrical housing member is generally cup-shaped.

12. A brake actuator, according to claim 6, wherein said sealing means is one of a packing cup and an o-ring.

13. A brake actuator, according to claim 12, wherein said sealing means is a packing cup.

14. A brake actuator, according to claim 6, wherein a predetermined length of said first plurality of elongated and generally flexible finger members connected to said power collet member is greater than a predetermined length of said second plurality of elongated and generally flexible finger members connected to said slack adjuster collet member.

15. A brake actuator, according to claim 6, wherein said portion of said slack adjuster collet member disposed between said pair of said radially opposed abutment surfaces carried by said flange member includes a pair of radially opposed abutment surfaces engagable with a respective one of said pair of abutment surfaces disposed on said flange member.

16. A brake actuator, according to claim 6, wherein said fluid communication means connected to said cylindrical housing member for communicating said predetermined fluid having said predetermined pressure to said interior portion of said cylindrical housing member during a brake application on such vehicle is a threaded pipe fitting.

17. A brake actuator, according to claim 6, wherein said brake actuator is responsive to pneumatic pressure.

18. A brake actuator, according to claim 6, wherein said brake actuator further includes a first spacer means disposed intermediate an inner surface of said hollow tubular stem portion and an outer surface of said threaded rod member for maintaining alignment of said threaded rod member during axial movement of said threaded rod member through said brake actuator during a brake application stroke and a brake release stroke.

19. A brake actuator, according to claim 18, wherein said brake actuator further includes a second spacer means disposed intermediate an inner surface of said flange member and said outer surface of said threaded rod member for maintaining said alignment of said threaded rod member during said axial movement of said threaded rod member through said brake actuator during said brake application stroke and said brake release stroke.

20. A brake actuator, according to claim 18, wherein said second spacer means further serves to prevent moisture and debris from entering said brake actuator.

* * * * *